Dec. 10, 1963  HANS-JÜRGEN REEBS  3,114,116
STABILIZED BRIDGE OSCILLATION GENERATOR
Filed Sept. 13, 1960

United States Patent Office 3,114,116
Patented Dec. 10, 1963

3,114,116
STABILIZED BRIDGE OSCILLATION
GENERATOR
Hans-Jürgen Reebs, Munich, Germany, assignor to Siemens & Halske Aktiengesellschaft Berlin and Munich, a corporation of Germany
Filed Sept. 13, 1960, Ser. No. 55,771
Claims priority, application Germany Oct. 14, 1959
8 Claims. (Cl. 331—139)

This invention is concerned with an oscillation generator for electromagnetic waves, with high constancy of amplitude and frequency, wherein the feedback is effected over a bridge circuit having in one branch thereof an element serving for limiting the amplitude and having in another branch thereof a frequency determining element, preferably an oscillating crystal.

Oscillators of this kind are distinguished by high frequency stability since the operatively effective phase steepness of frequency determining element is not only determined by circuit qualities but in considerable degree by the bridge damping. The element serving for the limitation of the amplitude level, a thermistor, affects the bridge damping with respect to changes in the output voltage of the bridge, thereby holding the generator output voltage approximately constant. A given power must be conducted to the input of the bridge for setting the desired working point of the regulation element, and a corresponding part of such power must be absorbed by the frequency determining element. This situation results in difficulties when high requirements are put on the frequency constancy of the bridge oscillator, which can be only realized by the use of oscillating crystals.

Oscillating crystals and especially oscillating quartz crystals must for known reasons be operated with very low power because they may otherwise be quickly destroyed or they will impermissibly change in time so far as their frequency is concerned. The requirements regarding on the one hand low loading of the oscillating crystal and on the other hand supply of a given minimum power to the bridge input, can be reconciled only by dimensioning the bridge branches or arms in the sense of diminishing the regulation properties of the bridge. However, despite a compromise in this direction, the loading of the oscillating crystal can generally not be reduced to an extent at which its influence on the frequency constancy remains negligible.

Oscillating crystals also exhibit a strongly temperature dependent resonance impedance. However, the constancy of the generator output voltage is to a high degree dependent upon the constancy of the branch resistors which supplement the regulation with respect to the bridge, so that the amplitude of the generator output voltage becomes upon use of an oscillating crystal as a frequency determining element, temperature dependent. Oscillating crystals produced in accordance with identical specifications also exhibit considerable exemplary scattering of their resonance impedance. This is of disadvantage especially in the mass production of such generators, since the bridges must be separately tuned and since any change of the oscillating crystal calls for a further adjusting operation.

The object of the present invention is to show a way for eliminating the above noted difficulties which appear in connection with an oscillating generator of the initially described type.

This object is according to the invention realized in connection with an oscillating generator for electromagnetic waves with high amplitude and high frequency constancy, in which the feedback is effected over a bridge having in one branch a regulation member for the amplitude limitation and in another branch a frequency determining element, preferably an oscillating crystal, by the provision of a regulation member having at least one regulation diode traversed by a regulation direct current which determines its differential impedance, such regulation direct current being derived from the alternating voltage supplied to the input of the regulation bridge.

The use of an exteriorly controlled regulation diode, in place of a thermistor or the like, permits applying to the input of the bridge, with optimum dimensioning of its individual branches, power as low as desired, so that the use, inter alia, of oscillating crystals in a combined frequency regulating bridge, will not cause any difficulties so far as obtaining a frequency constancy as high as possible is concerned. The high regulation steepness of the regulation diode also enables the exclusion, by regulation within wide limits, of fluctuations of the resonance impedance of the frequency determining element without particularly influencing the amplitude of the generator output voltage. It is moreover unnecessary to take, in the case of oscillating crystals, any measures for counteracting exemplary scattering of the resonance impedance by individual compensation of the bridge.

The various objects and features of the invention will now be explained with reference to the accompanying drawing showing embodiments thereof.

Figure 1:
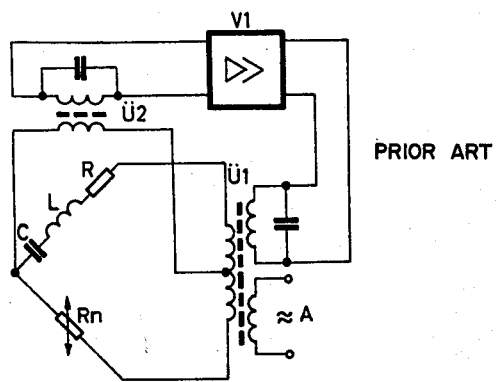
FIG. 1 shows a known bridge oscillator comprising an amplifier in feedback circuit with a combined frequency regulation bridge.

In FIG. 1, showing a known example of a bridge oscillator, wherein the amplifier V1 is in feedback circuit over a combined frequency regulation bridge, the input of the bridge is connected with the output of the amplifier V1 over the tuned transformer U1. The secondary winding of the transformer U1 is provided with a center tap and forms two of the four branches or arms of the bridge. The triggered alternating voltage can be taken off at the terminals of a third winding indicated at A. The two remaining bridge branches are respectively formed by a regulation thermistor $R_n$ and by an oscillating circuit comprising the coil L, the capacitor C and the loss resistor R. A tuned bridge output transformer U2, the secondary winding of which is disposed in the input circuit of the amplifier V1, completes the feedback circuit. The amplitude limitation of the output voltage is effected by the regulation thermistor $R_n$ which, as already mentioned, influences the bridge damping with respect to changes occurring respectively in the bridge input voltage and the generator output voltage. The bridge operates with high damping in the vicinity of the zero equalization. The result is that only very slight changes of the resistance value of the regulation thermistor $R_n$ are required for the regulation of high amplification fluctuations of the amplifier V1.

Figure 2:
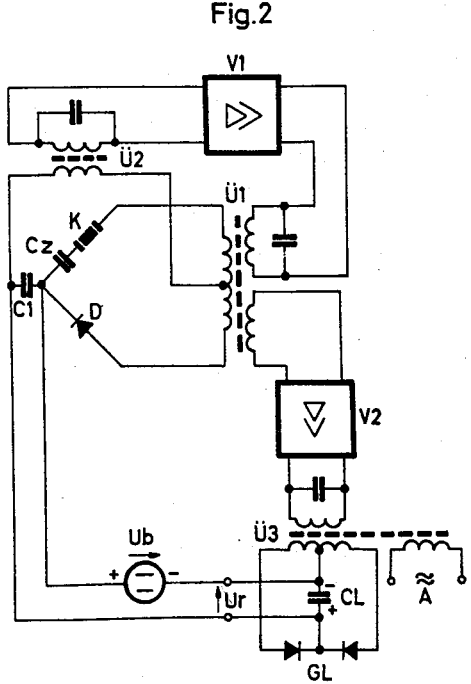
FIG. 2 illustrates a bridge oscillator according to the invention.

In FIG. 2, showing a modified bridge oscillator according to the present invention, structural elements corresponding to those included in FIG. 1 are similarly referenced. The oscillation circuit R, L, C and the regulation thermistor Rn of FIG. 1, are in FIG. 2 respectively substituted by the oscillating crystal K in series with the capacitor Cz and the regulation diode D. The left terminal of the primary winding of the transformer U2 is, in view of the connection of the regulation direct current traversing the regulation diode D, connected over the capacitor C1 to the common connecting point of the regulation diode D and the capacitor Cz. The third winding A of the transformer U1 which forms in FIG. 1 at its terminals the output of the generator, is in FIG. 2 connected with the input of an amplifier V2, the output transformer U3 which is likewise tuned, and has two secondary windings. A winding which is again indicated at A forms at its terminals the output proper of the generator according to the invention. The terminals of the second winding are connected with a rectifier arrangement consisting of the rectifiers GL and the load capacitor CL, the regulation direct voltage Ur formed by the output voltage thereof being connected with an opposing reference voltage Ub parallel to the capacitor C1. The difference voltage from the regulation direct voltage Ur and the reference direct voltage Ub drives over the primary winding of the transformer U2 and the secondary winding of the transformer U1, a regulation direct current through the regulation diode D which determines respectively the working point and the differential impedance of the regulation diode D.

With appropriately high amplification factor of the amplifier V2, the bridge input voltage can be very low without having to make any concessions concerning the bridge damping. A low bridge input voltage means that the oscillating crystal K as well as the regulation diode D are in desired and advantageous manner only slightly loaded. With respect to the oscillating crystal K, the low loading operates favorably regarding the frequency constancy, and with respect to the regulation diode D, the non-linear distortions are thereby held very small. Non-linear distortions are also produced by the rectifiers GL and can easily be suppressed by a negligibly small internal impedance of the amplifier V2. Negligibly small internal impedances can be obtained in amplifiers in known manner by a combined current and voltage feedback. A low internal impedance of the amplifier V2 has the additional advantage of avoiding load dependence of the alternating voltage taken off at the terminals of the winding.

The regulation direct voltage Ur is zero upon switching-in of the oscillation generator according to the invention shown in FIG. 2. The regulation diode D is biased only by the reference direct voltage Ub, such biasing being in blocking direction. The alternating current impedance of the diode is accordingly very high. The detuned bridge effects strong triggering of the oscillation which results in an increase of the input voltage of the bridge and therewith increase of the regulation direct voltage Ur. The blocking voltage of the regulation diode D is reduced and disappears when the regulation direct voltage Ur reaches the value corresponding to the oppositely directed reference direct voltage Ub. Upon further increase of the bridge input voltage, the difference voltage lying at the capacitor C1 will reverse its sign and the regulation diode D will become low ohmic, the bridge damping increases, and the amplitude will be limited.

Figure 3:
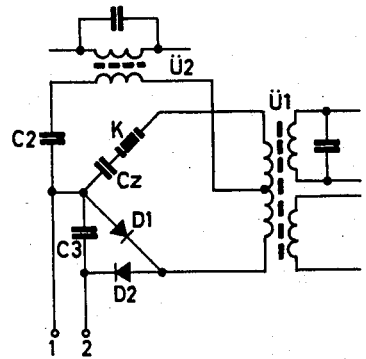
FIG. 3 represents a circuit arrangement applicable in instances posing high requirements with respect to linearity of the generator.

In the case of high requirements put on the linearity of the generator, the regulation diode D may be substituted by two regulation diodes connected in push-pull circuit. Such an arrangement is shown in FIG. 3. The regulation diodes D1 and D2 are thereby serially connected and are in one direction traversed by regulation direct current. So far as alternating current effect is concerned, they are by the capacitor C3 connected in parallel and with opposite polarity. The connection of the difference voltage from the regulation direct voltage Ur and the reference direct voltage Ub, lying on the series circuit of the regulation diodes D1 and D2, takes place over the lines 1 and 2. As compared with the circuit arrangement according to FIG. 2, the primary winding of the transformer U2 and the secondary winding of the transformer U1 are not traversed by regulation direct current, which can in some instances be of advantage. The separation in regard to direct current is effected by the capacitor C2 which interconnects the left terminal of the primary winding of the transformer U2 in alternating current relationship with the associated bridge point.

The reference direct voltage Ub in FIG. 2, which opposes the regulation direct voltage Ur, produces a considerably increased regulation sensitivity. Such sensitivity can suitably be stabilized in simple manner by the use of a Zener diode.

Figure 4:
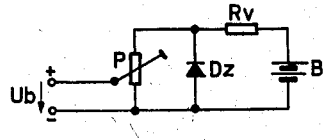
FIG. 4 indicates a circuit arrangement comprising means for regulating the reference direct voltage.

FIG. 4 shows a corresponding circuit arrangement in which the reference direct voltage Ub is regulatable. The direct voltage source B which is not stabilized, is over a resistor Rv connected with a Zener diode Dz. Parallel to the Zener diode Dz is disposed a potentiometer P over which the stabilized and regulatable reference direct voltage Ub can be taken off. The regulatability of the reference direct voltage Ub makes it possible to adjust the amplitude of the output voltage of the oscillation generator in simple manner and with the most simple means.

It is of course understood that the invention is not inherently limited for use with bridge oscillators utilizing an oscillating crystal as a frequency determining element but that it may likewise be advantageously employed when utilizing a normal LC circuit in place of the oscillating crystal.

Changes may be made within the scope and spirit of the appended claims which define what is believed to be new and desired to have protected by Letters Patent.

I claim:

1. An oscillation generator for electromagnetic waves with high amplitude- and frequency constancy, comprising an amplifier arrangement, a feedback circuit operatively coupling the amplifier input and output, a regulation bridge disposed in the feedback circuit, means for connecting said regulation bridge across one diagonal to the output and across the other diagonal to the input of the amplifier arrangement, one branch of said regulation bridge containing an oscillation crystal and another branch, which extends in parallel to said first named one branch, containing at least one regulation diode for effecting the amplitude regulation, circuit means connected to the output of the amplifier arrangement for deriving a regulation direct current therefrom, and further circuit means connecting to the regulation bridge and said regulation circuit means, whereby said diode is traversed by said regulation current.

2. An oscillation generator according to claim 1, comprising a second amplifier, means for conducting at least part of the alternating voltage appearing at the bridge input to the input of said second amplifier, the latter having an output for the alternating voltage and an output for the regulation direct voltage to be supplied to said regulation diode.

3. An oscillation generator according to claim 2, wherein said second amplifier has a negligibly low internal impedance.

4. An oscillation generator according to claim 1, comprising a reference direct voltage source, and means for connecting the regulation direct voltage circuit including said regulation diode in series with said reference direct voltage source, the latter being poled in opposition to said regulation voltage.

5. An oscillation generator according to claim 4, comprising means for adjusting the magnitude of said reference direct voltage.

6. An oscillation generator according to claim 4, comprising a Zener diode for stabilizing said reference direct voltage.

7. An oscillation generator according to claim 6, comprising means for adjusting the magnitude of said reference direct voltage.

8. An oscillation generator according to claim 1, wherein said regulation bridge includes two regulation diodes connected in push-pull circuit.

References Cited in the file of this patent
FOREIGN PATENTS 644,083     Great Britain _____ Oct. 4, 1950